United States Patent [19]

Peters

[11] Patent Number: 4,794,724
[45] Date of Patent: Jan. 3, 1989

[54] CONTAINMENT TYPE INSECT TRAP

[75] Inventor: Charles W. Peters, Eugene, Oreg.

[73] Assignee: Oak Stump Farm, Inc., Eugene, Oreg.

[21] Appl. No.: 186,917

[22] Filed: Apr. 27, 1988

[51] Int. Cl.⁴ ............................................. A01M 1/10
[52] U.S. Cl. ...................................... 43/122; 43/107
[58] Field of Search ...................... 43/107, 122, 132.1

[56] References Cited

U.S. PATENT DOCUMENTS 2,046,430  7/1936  Rutherford ........................... 43/107
3,997,999  12/1976  Evans .................................... 43/107
4,360,987  11/1982  Lowder ................................. 43/122

Primary Examiner—M. Jordan
Attorney, Agent, or Firm—Eugene D. Farley

[57] ABSTRACT

An insect trap, particularly a yellow jacket trap of improved efficiency has novel combination entryway and bait tray elements supported in its side walls. It also has provision for containing both liquid and solid insect bait in its bottom portion. Insects entering the trap after eating the bait, fail to find their way out, fly to exhaustion, and drown in the pool of liquid at the bottom of the trap.

11 Claims, 2 Drawing Sheets

CONTAINMENT TYPE INSECT TRAP

BACKGROUND AND GENERAL STATEMENT OF THE INVENTION

This invention relates to containment type insect traps, particularly yellow jacket traps of the class designed to lure insects into the trap interior by the use of scent and color, without the use of poisonous baits.

The desirability of ridding gardens, picnic areas, playgrounds and other premises of yellow jackets is self-evident.

This desideratum is accomplished with particular efficiency by the present invention by taking advantage of yellow jacket eating characteristics.

Two types of food are consumed by yellow jackets. The sterile female workers normally eat only sweet liquid carbohydrate materials the natural source of which is nectar from flowers or sweet "honeydew" produced by aphids.

The developing larvae in the nests, on the other hand, eat principally proteinaceous materials.

Accordingly, in carrying out their responsibility of providing food for the larvae, the workers forage for proteinaceous materials from meat, carrion, fish, and other insects. This protein is taken back to the nest to feed the growing larvae.

It is the general purpose of the present invention to provide an insect trap, particularly a yellow jacket trap, of improved efficiency in attracting the insects to the trap by being adapted to contain both proteinaceous and carbohydrate baits, thereby satisfying the insects' requirement and desire for both types of foods.

It is a further object of the present invention to provide an insect trap of improved efficiency in trapping and killing the insects.

Another important object of the present invention is the provision of a containment type insect trap which uses common household materials as attractions for the insects and does not require the use of poison baits.

Other objects of my invention are the provision of an insect trap which, in a sense, is self-baiting, since it retains within the trap the corpses of the killed insects, which provide additional protein for use by the workers.

Still further objects of my invention are the provision of an insect trap which is simply and inexpensively constructed; which is easy to maintain and operate; and which maintains the bait moist and in a condition of maximum efficiency over long periods of time.

The foregoing and other objects of the present invention are achieved by the provision of an insect trap which, in its broad aspect, comprises a container providing an insect containment chamber and having at least one wall opening. Insect entry means into the containment chamber is mounted in the wall opening. The entry means comprises an entryway segment and a proteinaceous bait tray segment.

A sump for containment of carbohydrate bait in the form of aromatic fruit juices, as well as for a further quantity of proteinaceous bait, is provided at the bottom of the containment chamber. The sump serves also as a drowning pool for the insects.

Insects entering the chamber via the entryway segment first approach the bait contained in the bait tray segment as well as in the sump Thereafter unable to find their way out, they fly about to exhaustion within the chamber and fall into the scent pool at the bottom of the chamber, where they drown.

THE DRAWINGS

DESCRIPTION OF PREFERRED EMBODIMENTS OF THE INVENTION

In the embodiment of the invention illustrated in FIGS. 1-4, the insect trap is housed in a container, indicated generally at 10, which may comprise to advantage an openmouthed, jar-type container provided with a screw top 12.

Figure 1:
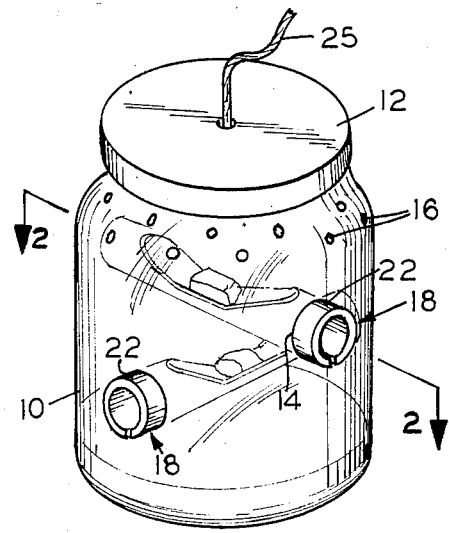
FIG. 1 is a top perspective view of the insect trap of my invention.
Figure 2:
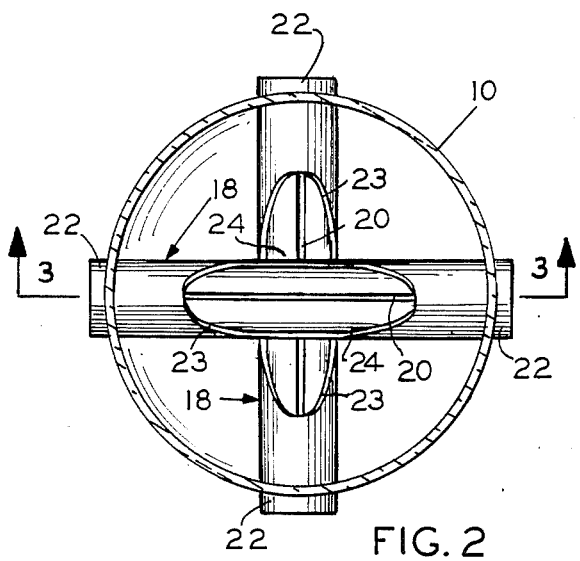
FIG. 2 is a transverse sectional view taken along line 2—2 of FIG. 1.

The container body preferably is fabricated from clear plastic which, if desired, may be tinted in a color attractive to yellow jackets or other insects. It is provided with one or more large side, wall openings 14, which serve a support function, and with a plurality of smaller openings 16, which serve a scent-emission function. The support openings are arranged in diametrically opposed and axially aligned pairs. In practice, there may be two pairs of such openings having axes arranged at right angles to each other, as shown in FIG. 2.

Figure 3:
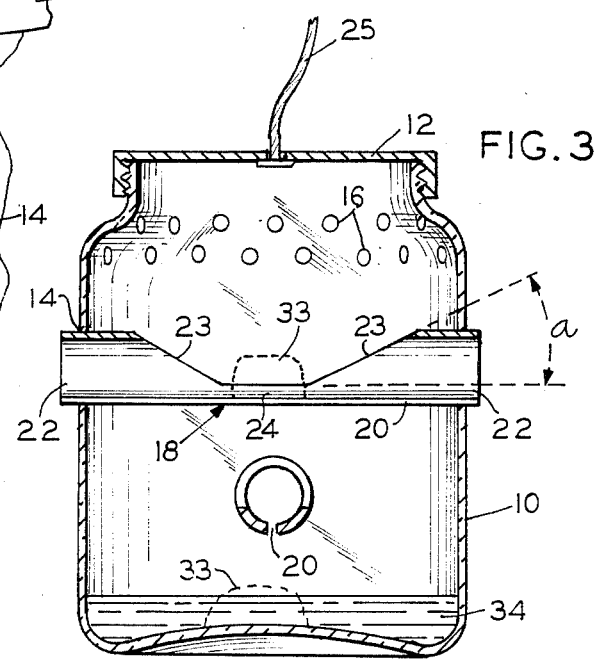
FIG. 3 is a longitudinal sectional view taken along line

The bottom of the container is liquid impervious and designed to contain a quantity of liquid 34, as shown in FIG. 3.

Support openings 14 are designed to receive and support novel combination entryway and bait tray elements which span the distance across the containment chamber.

Figure 4:
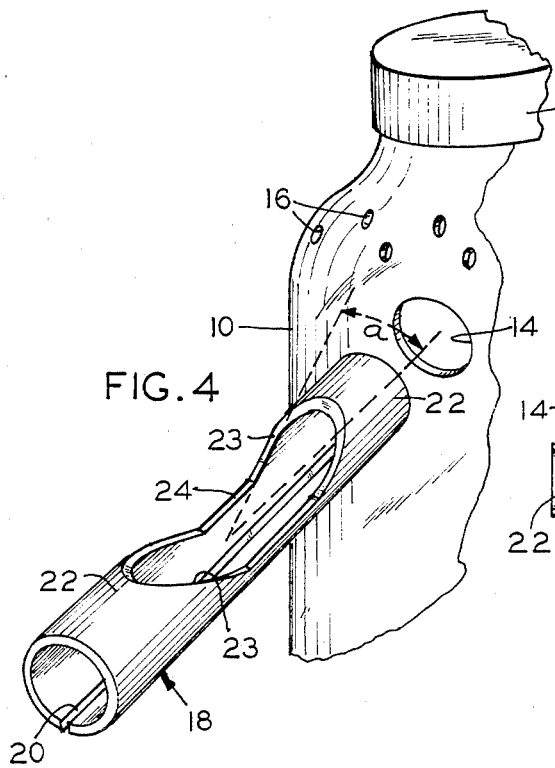
FIG. 4 is a fragmentary enlarged view in top perspective illustrating the manner of assembly of the trap, using a combination entryway and bait tray element in a first embodiment.

As shown particularly in FIG. 4, each of these elements, indicated generally at 18, comprises a length of tubing of a resilient character having a longitudinal slot 20.

The tube is slightly oversized with respect to the diameter of support opening 14. It is dimensioned in such a manner that upon compression it may be inserted into openings 14, spanning the chamber. Upon release of the constraining pressure it springs back and is maintained mounted across the chamber by the resulting frictional mounting means.

The end segments of tubing length 20 comprise entryway segments 22 through which the yellow jackets or other insects enter the trap. The central portion of the tubing length is cut away to provide a central bait tray segment 24 which is designed to support a quantity of the selected yellow jacket bait, such as fish, or meat.

The presence of the angled or arcuate merging sections 23 leading from bait tray segment 24 to entryway segments 22 is of some significance in the operation of the trap.

For reasons best known to yellow jackets, after gorging on the bait supported by the tray segment, the insects are motivated to crawl preferentially, up this ramp surface to the top surface of either entryway segment 22. Thus they are drawn away from the open ends of the tube and the chances of escape diminished accordingly.

I have found that, to achieve this desired purpose, the cut away opening providing bait tray segment 24 should also provide ramp segments sloping upwardly at an angle "a" of from about 25 to about 65 with respect to the horizontal.

Screw-on top 12 is provided with a cord 25 by which the assembly is supported. Also, it preferably is painted white, bright yellow, or some other color which tends to attract the insects to the trap.

Figure 5:
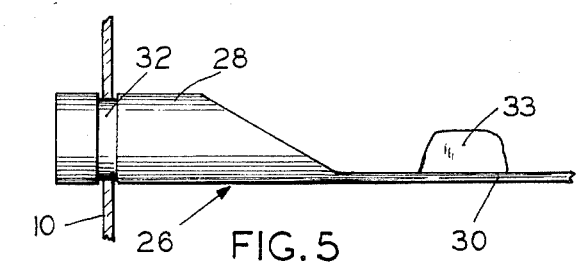
FIG. 5 is a detail view in side elevation of a combination entryway and bait tray element useful in the trap of my invention, in a second embodiment.

The embodiment of FIG. 5 is similar, except that the combination entryway and bait tray element 26 is divided into two sections.

As illustrated in FIG. 5, each element 26 comprises a length of tubing or other structural material cut away to provide an entryway segment 28 and a bait tray segment 30. The entryway segment is characterized at its outer end by an external annular groove 32 by means of which the element 26 is supported frictionally in a side wall opening 14 of container 10.

Figure 6:
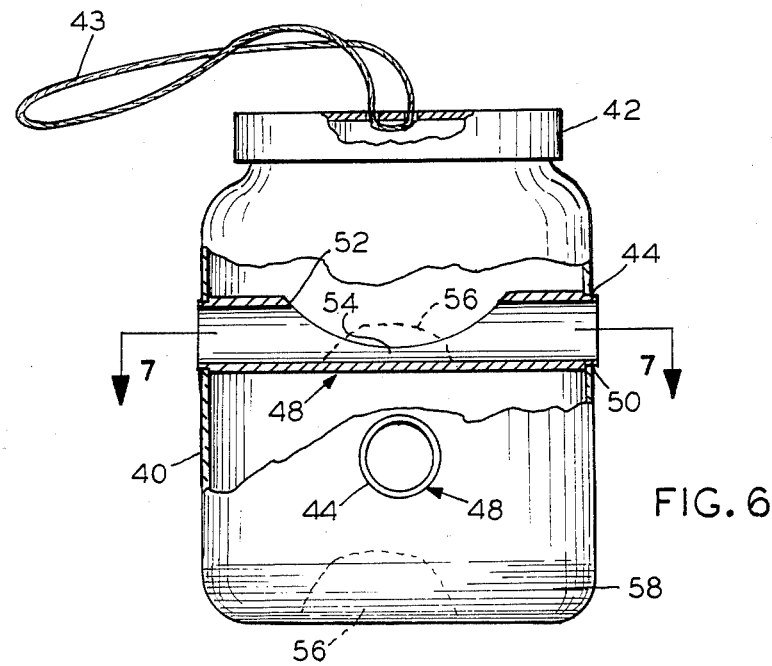
FIG. 6 is a view in side elevation of the insect trap of my invention in a third embodiment, partly broken away to show interior construction.
Figure 7:
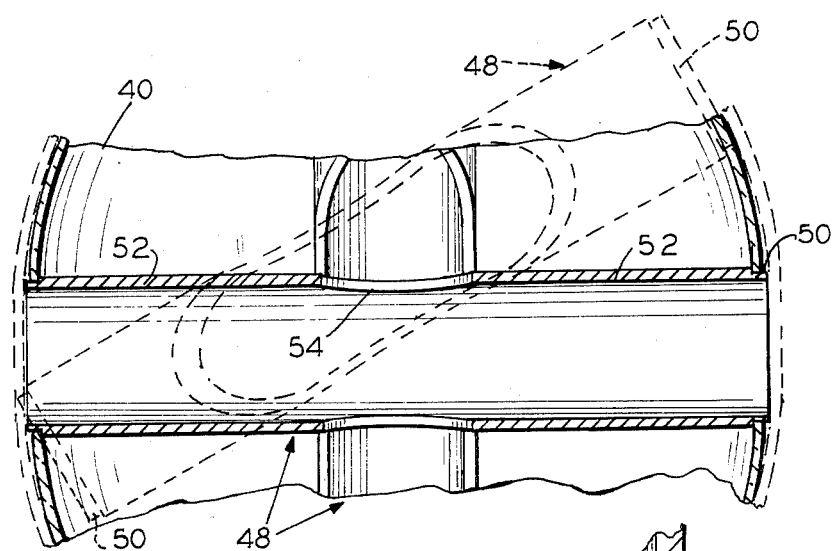
FIG. 7 is a transverse sectional view taken along line 7—7 of FIG. 6.
Figure 8:
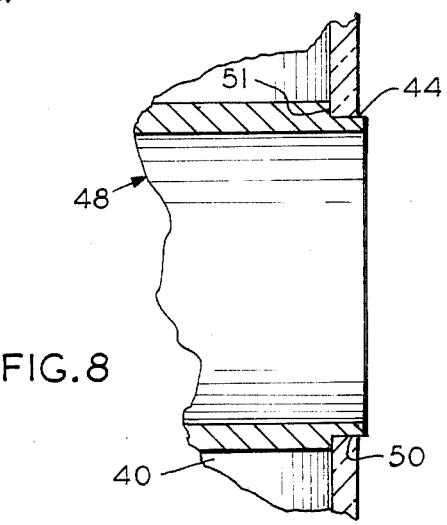
FIG. 8 is an enlarged, fragmentary, detailed view further illustrating the construction of the trap of FIGS. 6 and 7.

The embodiment of FIGS. 6, 7 and 8 is similar, but differs in the provision of novel combination entryway and bait tray elements.

As illustrated in those figures, the trap includes a container indicated generally at 40, which may comprise an open mouth, jar-type container having resiliently flexible side walls which are shiftable upon the application of pressure between the normal (full line) and distended (dashed line) positions of FIG. 7. The container also is fitted with a screw top 42 to which is attached a looped cord 43 by means of which the trap may be suspended from a suitable support.

The container thus may comprise a conventional wide mouthed bottle having a top and resiliently flexible side walls. It is provided with at least one pair of diametrically opposed side wall openings 44 which serve a support function. In practice, there may be two pairs of such diametrically opposed openings having axes arranged at right angles to each other.

The bottom of the container is liquid impervious and designed to contain a quantity of liquid, as shown in FIG. 6.

Openings 44 are designed to receive and support novel combination entryway and bait tray elements 48 which are analogous in function to those illustrated at 18 in the embodiment of FIGS. 1-4. Each comprises a length of tubing which is slightly oversized with respect to the diameter of openings 44. Each is slightly longer than the cross section of container 40.

Each of the novel combination entryway and bait tray elements is divided into three segments as follows:

At each end, an insert segment 50 having a cross sectional diameter such as to be insertable into openings 44 in the container wall.

At each end, inwardly from the insert segments, a tubular entryway segment 52 through which the insects crawl on their way to the interior of the trap.

Centrally, an arcuate cut-away portion which constitutes a feed tray segment 54.

Solid proteinaceous food such as fish or meat scraps 56 is adapted to be placed both on bait tray segment 48 and on the floor of the container.

Liquid carbohydrate food such as apple juice or other fruit juice 58 is adapted to be placed on the floor of the container.

Annular groove 50 forms a shoulder 51 which serves as an abutment in the fitted position of the combination entryway and food tray element.

The manner of insertion of combination entryway and bait tray element 48 is apparent from FIG. 7.

The element is introduced through the open top of the container and placed endwise with a thrusting motion in one of openings 44. This distends the resiliently flexible container to its dashed line position. The other end of the element then may be snapped into the companion opening 44. Frictional engagement firmly seats the element in its operative full line position, ready for loading with bait.

OPERATION

In the use of the embodiments of FIGS. 1-5, solid bait such as fish or meat scraps 33 is placed on bait tray segment 24 of the embodiment of FIGS. 1-4, or on the corresponding segment 30 in the embodiment of FIG. 5. In both cases it also may be placed to advantage in the bottom of the container.

Liquid bait 34, particularly a fruit juice such as apple juice, is placed in the bottom of the container to form a combination scent and drowning pool or sump. The deteriorating fish or meat, and the fermenting fruit juice create a powerful scent which escapes through the open entryways of the device as well as through openings 16 in the container. This scent, coupled with the attractant color of lid 12, successfully attracts any yellow jackets in the vicinity.

The yellow jackets or other insects enter the container via the entryway segments 22 or 28 of the respective bait support elements and feast on solid bait 33 on bait tray 30. They feed also on the solid bait 33 supported on the bottom of the container, as well as on the liquid bait 34, also located on the bottom of the container. Still further, being cannibalistic in nature, they feed on the bodies of any deceased yellow jackets present in the liquid pool.

The insects feeding on the solid bait supported on bait tray 24 (or bait tray 30), having completed their meal, are prone to crawl up the ramp 23 which connects the bait tray segment with the entryway segment of element 18. They thereby are conducted away from the escape openings.

Having fed, the insects fly about in the container until exhausted. Thereupon they drop into liquid bait pool 34 and are drowned.

The manner of operation of the trap of FIGS. 6-8 is similar.

By observation, I have found that in a typical operation the trap effectively kills several hundred yellow jackets a day. This result is achieved without the use of poisonous bait, thereby eliminating the principal hazard associated with many of the prior art insect traps.

Having thus described in detail a preferred embodiment of the present invention, it will be apparent to those skilled in the art that various physical changes could be made in the device described herein without altering the inventive concepts and principles embod- ied. The present embodiment is therefore to be considered in all respects as illustrative and not restrictive, the scope of the invention being indicated by the appended claims.

I claim:

1. An insect trap comprising:
   (a) a container having at least one wall opening and providing an insect containment chamber;
   (b) insect entry means comprising an entryway segment and a bait tray segment; and
   (c) mounting means for mounting the entry means in the opening with its entryway segment communicating with the opening and its bait tray segment projecting inwardly into the interior of the container.

2. The insert trap of claim 1 wherein the entry means comprises a length of tubing cut away to provide adjacent entryway and bait tray segments.

3. The insert trap of claim 2 wherein the entry means lies in a substantially horizontal plane and the tubing length is cut away to form an upwardly sloping connection between the two segments, the average slope of the connection being from 25 to 65 degrees and providing a ramp to be traversed by the insects after gorging on bait supported on the bait tray segment, guiding them away from the opening through the container wall.

4. The insect tray of claim 1 wherein the mounting means comprises frictional mounting means.

5. The insect tray of claim 1 wherein there are two openings diametrically opposite each other, and the entry means comprise a single length of tubing mounted in the openings and extending across the interior of the container to provide a pair of entryway segments in the openings, the tubing length being centrally cut away to provide communicating bait tray segments.

6. The insect trap of claim 5 wherein the tubing is comprised of resilient structural material is oversized with respect to the diameter of the openings, and including a longitudinal slot extending the length of the tubing to provide a frictional spring mounting of the entryway segments in the openings.

7. The insect trap of claim 1 wherein the containment chamber has a liquid-impervious bottom to provide a supplemental bait tray designed to support and contain liquid insect bait.

8. The insect tray of claim 1 designed for use with scented baits and provided with a plurality of openings through the container wall to permit escape of the scent.

9. The insect trap of claim 1 including an operator access opening for cleaning and baiting the trap.

10. The insect trap of claim 9 wherein the container comprises a jar-type container having an open mouth providing the access opening, and a cap therefore, the cap being colored with a pigment of a color designed to attract insects.

11. An insect trap comprising:
   (a) a container having an open top and a closure therefore as well as resiliently flexible side walls shiftable upon the application of displacing pressure between normal and distended positions:
   (b) a pair of openings through the side walls arranged opposite each other;
   (c) a piece of tubing having an outside diameter greater by a predetermined amount than the diameter of the openings and a length greater by a predetermined amount than the cross section of the container;
   (d) the tubing having at each of its ends an annular groove providing an insert segment and a contiguous abutment shoulder;
   (e) the insert segment being insertable in the container side wall openings in the distended position of the container side walls and being frictionally retained therein in the normal position of the side walls with the abutment shoulders in bearing engagement therewith;
   (f) the tubing being centrally cut-away to provide also a central bait tray segment and a pair of insect entryway segments communicating with the insert segments to provide a passageway for the insects into the interior of the trap.

* * * * *

REEXAMINATION CERTIFICATE (3878th)

United States Patent [19]

Peters

[11] B1 4,794,724
[45] Certificate Issued Sep. 21, 1999

[54] CONTAINMENT TYPE INSECT TRAP

[75] Inventor: Charles W. Peters, Eugene, Oreg.

[73] Assignee: Oak Stump Farm, Inc., Eugene, Oreg.

Reexamination Request:
No. 90/004,824, Nov. 3, 1997

Reexamination Certificate for:
Patent No.: 4,794,724
Issued: Jan. 3, 1989
Appl. No.: 07/186,917
Filed: Apr. 27, 1988

[51] Int. Cl.[6] ................................ A01M 1/10
[52] U.S. Cl. ............................. 43/122; 43/107
[58] Field of Search ........................ 43/122, 121

[56] References Cited

U.S. PATENT DOCUMENTS

| | | | |
|---|---|---|---|
| 352,289 | 11/1886 | Barnes et al. | 43/121 |
| 554,616 | 2/1896 | Cook | 43/121 |
| 649,484 | 5/1900 | Schlachter | 43/121 |
| 882,306 | 3/1908 | Frederickson . | |
| 1,018,277 | 2/1912 | Suhre | 43/121 |
| 1,277,354 | 9/1918 | Arabian . | |
| 1,327,230 | 1/1920 | Fairbanks | 43/121 |
| 1,364,949 | 1/1921 | Niewinski . | |
| 1,485,867 | 3/1924 | Mooney | 43/121 |
| 2,046,430 | 7/1936 | Rutherford . | |
| 2,997,806 | 8/1961 | Duvall | 43/121 |
| 3,619,934 | 11/1971 | Tunstall | 43/121 |
| 3,803,753 | 4/1974 | Feigin et al. . | |
| 3,885,341 | 5/1975 | Kuchenbecker | 43/121 |
| 3,911,612 | 10/1975 | Sorenson et al. . | |
| 3,997,999 | 12/1976 | Evans . | |
| 4,263,740 | 4/1981 | Hemsarth | 43/121 |
| 4,349,981 | 9/1982 | Sherman . | |
| 4,360,987 | 11/1982 | Lowder . | |
| 4,364,194 | 12/1982 | Clark, Sr. . | |
| 4,400,904 | 8/1983 | Baker . | |
| 4,485,582 | 12/1984 | Morris . | |
| 4,581,845 | 4/1986 | Burkholder et al. . | |
| 4,638,592 | 1/1987 | Schneidmiller . | |

*Primary Examiner*—Kurt Rowan

[57] ABSTRACT

An insect trap, particularly a yellow jacket trap of improved efficiency has novel combination entryway and bait tray elements supported in its side walls. It also has provision for containing both liquid and solid insect bait in its bottom portion. Insects entering the trap after eating the bait, fail to find their way out, fly to exhaustion, and drown in the pool of liquid at the bottom of the trap.

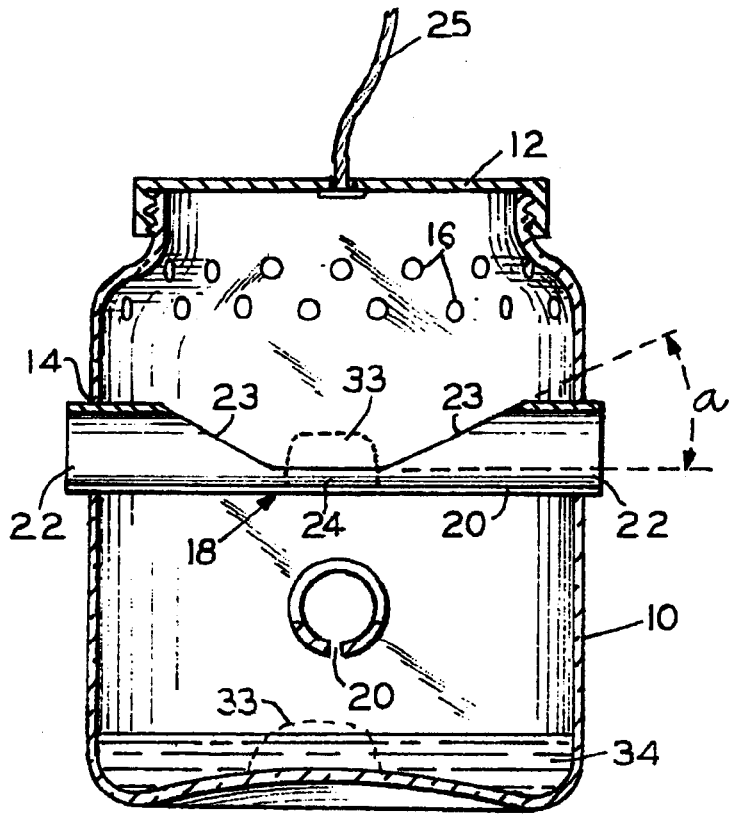

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 6 and 11 is confirmed.

Claims 1, 2, 4, 7–10 are cancelled.

Claims 3 and 5 are determined to be patentable as amended.

3. [The] *An* insect trap [of claim 2 wherein the] *comprising:*
  (*a*) *a container having at least one wall opening and providing an insect containment chamber;*
  (*b*) *insect* entry means *comprises an entryway segment and a bait tray segment, said entry means comprising a length of tubing cut away to provide adjacent entryway and bait tray segments; and*
  (*c*) *mounting means for mounting the entry means in the opening with its entryway segment communicating with the opening and its bait tray segment projecting inwardly into the interior of the container, said entry means lying* [lies] *in a substantially horizontal plane and said tubing length is cut away to form an upwardly sloping connection between the two segments, the average slope of the connection being from 25 to 65 degrees and providing a ramp to be traversed by the insects after gorging on bait supported on the bait tray segment, guiding them away from the opening through the container wall.*

5. [The] *An* insect [tray of claim 1 wherein there are] *trap comprising:*
  (*a*) *a container having at least one wall opening and providing an insect containment chamber;*
  (*b*) *insect entry means comprising an entryway segment and a bait tray segment, said entry means comprising a length of tubing cut away to provide adjacent entryway and bait tray segments; and*
  (*c*) *mounting means for mounting the entry means in the opening with its entryway segment communicating with the opening and its bait tray segment projecting inwardly into the interior of the container, said insect trap having* two openings diametrically opposite to each other, and the entry means comprise a single length of tubing mounted in the openings and extending across the interior of the container to provide a pair of entryway segments in the openings, the tubing length being centrally cut away to provide communicating bait tray segments.

* * * * *